United States Patent
Prigge et al.

(10) Patent No.: US 10,032,474 B2
(45) Date of Patent: Jul. 24, 2018

(54) UNSUCCESSFUL STORAGE MEDIA MOVEMENT HANDLING IN AUTOMATED REMOVABLE STORAGE MEDIA ENVIRONMENTS

(71) Applicant: Quantum Corporation, San Jose, CA (US)

(72) Inventors: Carsten Prigge, Elizabeth, CO (US); Alexander Hois, Centennial, CO (US)

(73) Assignee: Quantum Corporation, San Jose, CA (US)

( * ) Notice: Subject to any disclaimer, the term of this patent is extended or adjusted under 35 U.S.C. 154(b) by 4 days.

(21) Appl. No.: 15/372,169

(22) Filed: Dec. 7, 2016

(65) Prior Publication Data
US 2018/0158481 A1   Jun. 7, 2018

(51) Int. Cl.
*G11B 15/68* (2006.01)

(52) U.S. Cl.
CPC ........ *G11B 15/6895* (2013.01); *G11B 15/687* (2013.01); *G11B 15/688* (2013.01)

(58) Field of Classification Search
CPC .. G11B 15/687; G11B 15/688; G11B 15/6895
See application file for complete search history.

(56) References Cited

U.S. PATENT DOCUMENTS

| | | | | | |
|---|---|---|---|---|---|
| 4,932,826 | A * | 6/1990 | Moy | ...................... | G06F 3/0601 360/92.1 |
| 6,785,588 | B2 * | 8/2004 | Dimitri | ............... | G06F 11/2092 700/214 |
| 6,950,723 | B2 * | 9/2005 | Gallo | ..................... | G06F 3/0605 700/214 |
| 7,076,327 | B1 * | 7/2006 | Desai | ..................... | G06F 3/0613 700/213 |
| 8,494,674 | B2 * | 7/2013 | McClelland | ........... | G11B 15/66 700/218 |
| 8,953,270 | B2 * | 2/2015 | Suzuki | ............... | G11B 15/6835 360/55 |
| 9,020,921 | B2 * | 4/2015 | Alber | .................. | G11B 27/002 707/705 |
| 9,349,410 | B2 * | 5/2016 | Greco | ................ | G11B 15/6835 |
| 2003/0065667 | A1 * | 4/2003 | Dahman | .............. | G11B 15/689 |

* cited by examiner

*Primary Examiner* — Thomas Randazzo (57) ABSTRACT

Embodiments disclosed herein provide systems, methods, and computer readable media to handle unsuccessful movements of removable storage media in an automated removable media system. In a particular embodiment, a method provides receiving one or more user provided parameters that indicate one or more types of unsuccessful media move operations that should be reported as successful. The method further provides receiving a first request to move a first item of removable storage media from a first position in the automated removable media system to a second position in the automated removable media system and initiating a first move operation of the first item from the first position to the second position by at least one changer device. The method then provides determining that the first move operation resulted in one of the one or more types of unsuccessful media move operations and indicating that the first move operation was successful in response to the first request.

20 Claims, 8 Drawing Sheets

| ALLOWED UNSUCCESSFUL MOVE PARAMETERS 500 | |
|---|---|
| FROM | TO |
| any storage | any storage |
| any storage | imp./exp. 331,332 |
| any drive | imp./exp. 331,332 |
| any drive | any storage |

UNSUCCESSFUL STORAGE MEDIA MOVEMENT HANDLING IN AUTOMATED REMOVABLE STORAGE MEDIA ENVIRONMENTS

TECHNICAL FIELD

Aspects of the disclosure are related to the movement of items of removable storage media and, in particular, to the handling of unsuccessful item movements.

TECHNICAL BACKGROUND

Removable media types, such as magnetic tape cartridges or optical discs, are sometimes packaged into systems that allow for many items of removable media to be stored and placed into an access device when needed. Some type of automated device(s), such as robotic arms, may be used to automatically retrieve a media item from a storage slot and place it into an access device for either writing data to or reading data from that media item. For example, magnetic tape libraries are designed to hold hundreds or even thousands of magnetic tape cartridges. Depending on how many tapes a library is designed to access at once, each library includes one or more drives with which the tapes can be accessed. When a host system that manages the data stored on the magnetic tape cartridges intends to access a particular magnetic tape cartridge not currently in a drive, the host system requests that a robotic arm in the library move the cartridge from its storage slot to a drive. Likewise, when the host system determines that the magnetic tape cartridge can be moved back to a storage slot, the host system requests that the cartridge be moved from the drive to a storage slot.

Typically, if a movement requested by the host system fails, the host system receives notice of the failure so that the host system does not proceed with operations under the assumption that the requested movement occurred as expected. For instance, if the host system requests a particular tape cartridge be moved into a particular drive and the tape cartridge does not end up in that drive, then host system would need to be notified of that fact so that host system does not attempt to access that tape cartridge using the requested drive. Thus, when a move operation is not successful, the host system may simply suspend operations until the failure can be addressed by a user or otherwise. However, while in the aforementioned example it is likely that a user would want the host system should stop operations, there may be some types of move operations whose failure the user would not want to cause the suspension of host system operations.

OVERVIEW

Embodiments disclosed herein provide systems, methods, and computer readable media to handle unsuccessful movements of removable storage media in an automated removable media system. In a particular embodiment, a method provides receiving one or more user provided parameters that indicate one or more types of unsuccessful media move operations that should be reported as successful. The method further provides receiving a first request to move a first item of removable storage media from a first position in the automated removable media system to a second position in the automated removable media system and initiating a first move operation of the first item from the first position to the second position by at least one changer device. The method then provides determining that the first move operation resulted in one of the one or more types of unsuccessful media move operations and indicating that the first move operation was successful in response to the first request.

In some embodiments, the method provides determining an alternative position in the automated removable media system to which the first item was moved. In those embodiments, the method may further provide receiving a second request and before handling the second request, indicating that the first item is located in the alternative position.

In some embodiments, indicating that the first item is located in the alternative position comprises reporting a Small Computer System Interface (SCSI) Unit Attention (UA) code indicating that a status of at least one item of removable storage media has changed and providing the alternative position as a status of the first item.

In some embodiments, the first position and the second position each comprise one of a media storage position type, a media import/export position type, and a data transfer position type.

In some embodiments, at least one of the one or more types of unsuccessful media move operations that should be reported as successful comprises an unsuccessful media move operation wherein the second position comprises the media storage position type or the import/export position type but not the data transfer position type.

In some embodiments, the one or more user provided parameters indicate that unsuccessful media move operations that require a specific position for the second position should be reported as unsuccessful.

In some embodiments, the one or more user provided parameters indicate that unsuccessful media move operations associated with a certain application should be reported as unsuccessful.

In some embodiments, the first request comprises a Small Computer System Interface (SCSI) move command.

In some embodiments, the first item comprises a magnetic tape cartridge, the automated removable media system comprises a robotic tape library, and the at least one changer device comprises a robotic arm.

In another embodiment, a system is provided having one or more computer readable storage media and a processing system operatively coupled with the one or more computer readable storage media. Program instructions stored on the one or more computer readable storage media, when read and executed by the processing system, direct the processing system to receive one or more user provided parameters that indicate one or more types unsuccessful media move operations that should be reported as successful. The program instructions further direct the processing system to receive a first request to move a first item of removable storage media from a first position in the automated removable media system to a second position in the automated removable media system and initiate a first move operation of the first item from the first position to the second position by at least one changer device. The program instructions then direct the processing system to determine that the first move operation resulted in one of the one or more types of unsuccessful media move operations and indicate that the first move operation was successful in response to the first request.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

To avoid interruptions caused by unsuccessful move operations performed on items of removable storage media, the examples herein indicate that at least predefined types of unsuccessful move operations are still reported as being successful move operations. If those unsuccessful move operations were reported as being unsuccessful, then the system that requested the move operation may pause remaining operations until the unsuccessful move operation can be addressed, either by a system administrator or otherwise. In general, a type of unsuccessful move operation that is reported as successful is a move operation where the exact parameters are fungible. For example, a library of removable storage media items may include drive slots, where data is read from and written to the items, and storage slots that merely provide a place to store the item when not being accessed by a drive. While a move operation may request that an item be moved to a specific storage slot, in all likelihood, another storage slot would serve the same purpose. Thus, the embodiments herein allow for that item to be placed in another storage slot, which would be an unsuccessful move operation, while indicated that the move operation was successful.

Figure 1:
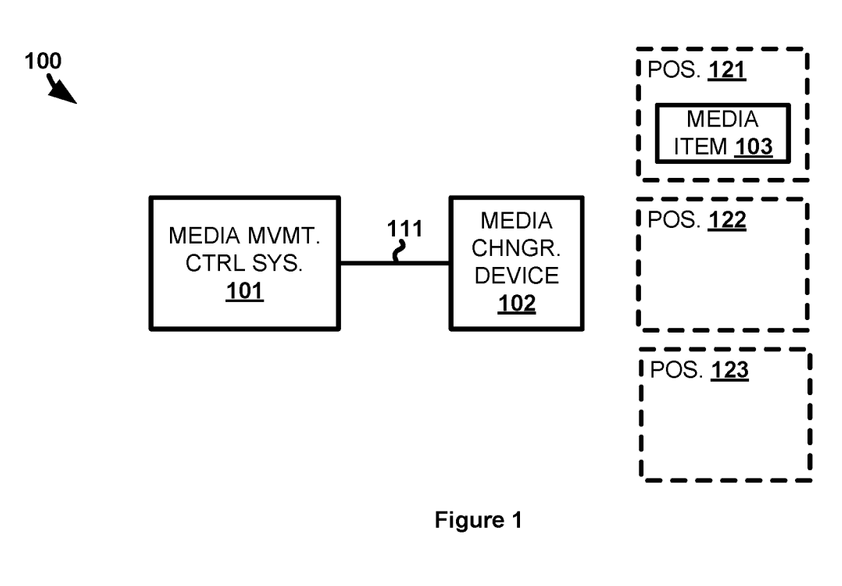
FIG. 1 illustrates an automated removable media system that handles unsuccessful movements of removable storage media items.

FIG. 1 illustrates automated removable media system 100 that handles unsuccessful movements of removable storage media items. Automated removable media system 100 includes media movement control system 101 and media changer device 102. Media movement control system 101 and media changer device 102 communicate over communication link 111, although at least some components of system 101 and device 102 may be incorporated.

In operation, media movement control system 101 controls media changer device 102 to move items of removable storage media between positions of automated removable media system 100. While this example only shows a single removable media item 103 and three positions 121-123 in which removable media items can be placed, it should be understood that the automated removable media system 100 could include any number of positions and any number of removable media items. Likewise, media changer device 102 may include more than one media changer devices, such as multiple robotic arms, for moving removable media items between positions. Positions 121-123 could be media storage positions, media import/export positions (e.g., positions that allow users to remove items from and insert media items into automated removable media system 100), data transfer positions (e.g., drives for accessing the media items), or some other type of position into which removable media items may be placed—including combinations thereof.

Figure 2:
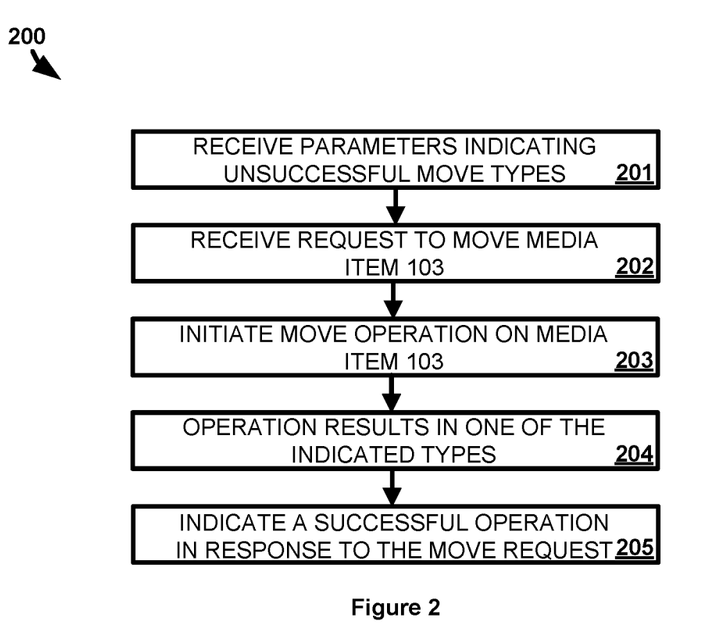
FIG. 2 illustrates a method of operating the automated removable media system to handle unsuccessful movements of removable storage media items.

FIG. 2 illustrates method 200 of operating automated removable media system 100 to handle unsuccessful movements of removable storage media items. Method 200 provides media movement control system 101 receiving one or more user provided parameters that indicate one or more types of unsuccessful media move operations that should be reported as successful (201). One or more users may provide the user provided parameters directly into a user interface of media movement control system 101 (if media movement control system 101 is so equipped) or by way of another computing system, such as a personal workstation of the user, in communication with media movement control system 101. The user provided parameters indicate the types of unsuccessful media move operations based on type of slot to which the move operation is directed, based on the specific slot to which the move operation is directed, the time in which the move operation is performed, the application requesting the move operation, or any other type of parameter—including combinations thereof. The user provided parameters may indicate types of unsuccessful media move operations by defining the types in the affirmative (i.e., define which types qualify as types that should be reported as successful), may define the types in the negative (i.e., define which types do not qualify as types that should be reported as successful), or may use some combination thereof.

Method 200 further provides media movement control system 101 receiving a request to move removable media item 103 from one position, position 121 in this example, to another position, position 122 in this example (202). The request may be received from a host system that manages the movement of removable media items and the data stored on the removable media items, may be generated by media movement control system 101 itself, or may be received from some other type of system. In response to receiving the request, media movement control system 101 initiates a move operation of removable media item 103 from position 121 to position 122 by media changer device 102 (203). The move operation involves media changer device 102 removing removable media item 103 from position 121 and attempting to place removable media item 103 into position 122 as requested. Ideally, removable media item 103 is placed into position 122 by media changer device 102 without any problems and media movement control system 101 would indicate that the move operation was completed successfully. However, sometimes media changer device 102 conditions exist that prevent media changer device 102 from doing so. For example, position 122 may have developed a physical defect or may be temporarily inaccessible due to being ejected, removed or otherwise offline for operation, that blocks removable media item 103 from being placed into position 122, although other reasons for preventing removable media item 103 from being placed into position 122 may exist.

In this example, media changer device 102 is unable to place removable media item 103 into position 122. However, instead of simply indicating that the move operation was unsuccessful, media movement control system 101 determines whether the unsuccessful move of removable media item 103 is of a type that should be indicated as being successful. To make the determination media movement control system 101 may compare the characteristics of the move operation to the definitions in the user defined parameters. For the purposes of this example, method 200 provides media movement control system 101 determining that the move operation resulted in one of the one or more types of unsuccessful media move operations (204). Of course, in other examples, the move operation may be successful and, in those examples, media movement control system 101 would determine that the successful operation occurred.

Method 200 then provides media movement control system 101 responsively indicating that the first move operation was successful in response to the first request (205). For instance, if the move request was received from another computing system, then media movement control system 101 notifies that computing system that the move operation was successful. Alternatively, media movement control system 101 may indicate that the move operation was successful through a user interface or some other manner of indicating to a user or other system that a requested move operation was successful. In other examples, if media movement control system 101 determines that the unsuccessful move operation was not one of the types that should be reported as successful, then media movement control system 101 may indicate that the requested move operation was unsuccessful.

In some examples, even though removable media item 103 was not able to be placed into position 122, removable media item 103 may be placed in position 123 instead. In those examples, media movement control system 101 may be configured to update the move requestor with the actual position where removable media item 103 is located after the move. In particular, since removable media item 103 was not placed in position 122, the move operation into position 122 was unsuccessful. However, if the move operation is reported as being successful in accordance with method 200 above, the move requestor would assume that removable media item 103 is now located in position 122. Thus, the move requestor would have to be updated to be aware of removable media item 103's actual position 123 to prevent removable media item 103 from being incorrectly tracked by the move requestor.

Referring back to FIG. 1, media movement control system 101 comprises a computer processor system and a communication interface. Media movement control system 101 may also include other components such as a user interface, router, server, data storage system, and power supply. Media movement control system 101 may reside in a single device or may be distributed across multiple devices. Media movement control system 101 may comprise a personal computer, application server, driver controller, or some other computing apparatus—including combinations thereof.

Media changer device 102 comprises components for moving removable media items between positions 121-123 and an interface for communicating with media movement control system 101. Media changer device 102 may include motors, belts, gears, or some other type of moving component. In some cases, media changer device 102 may include processing circuitry for controlling the moving components. In one example, media changer device 102 may comprise one or more robotic arm apparatuses for grabbing and repositioning removable media items.

Removable media item 103 may comprise any type of removable storage media that can be moved by media changer device 102. Removable storage medium 103 may comprise magnetic tape, optical disk, magnetic disk, flash memory, or some other type of removable memory. In general, removable storage media comprises any type of computer readable medium that is designed to be readily removed and not always be coupled to a computing system capable of reading that media. For example, magnetic tape cartridges are designed for access by a computing system when inserted into a magnetic tape drive but can be removed for portability or to free up the drive for access to other magnetic tape cartridges. In some cases, media types may be considered removable depending on the type of enclosure used. For instance, a hard disk drive may be placed in an enclosure allowing for easy insertion and removal from a system rather than being more permanently installed. In no examples is removable storage medium 103 a mere propagated signal.

Communication link 111 uses metal, glass, air, space, or some whet material as the transport media. Communication link 111 could use various communication protocols, such as Time Division Multiplex (TDM), Internet Protocol (IP), Ethernet, RS-232, Controller Area Network (CAN), communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be direct links or may include intermediate networks, systems, or devices.

Figure 3:
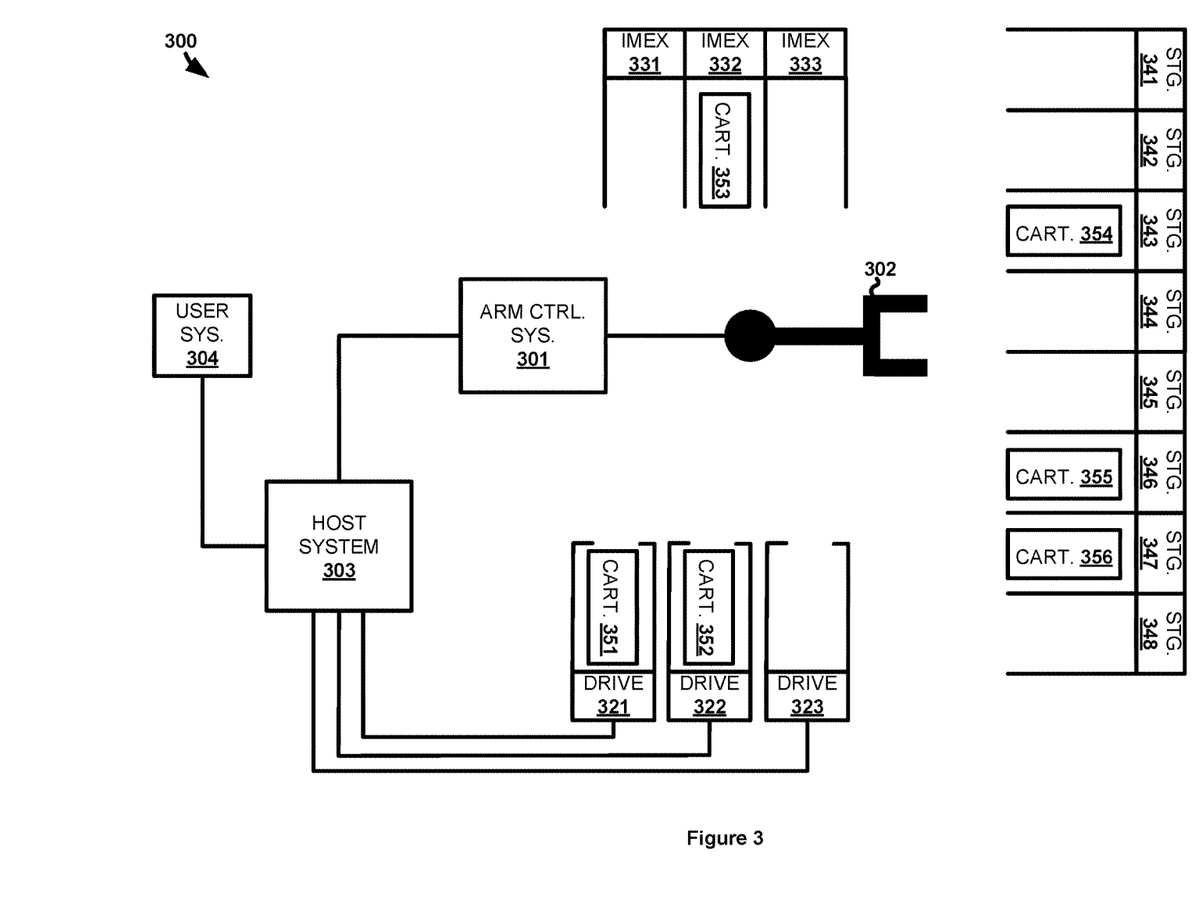
FIG. 3 illustrates another automated removable media system that handles unsuccessful movements of removable storage media items.

FIG. 3 illustrates automated removable media system 300 that handles unsuccessful movements of removable storage media items. In this example, automated removable media system 300 comprises a robotic magnetic tape library that includes robotic arm control system 301, robotic arm 302, host computing system 303, and user system 304. Robotic arm 302 is an example of media changer device 102 from automated removable media system 100. Likewise, robotic arm control system 301 is an example of media movement control system 101 from automated removable media system 100. Since automated removable media system 300 is a magnetic tape library, the removable media items in this case are magnetic tape cartridges 351-356. Automated removable media system 300 includes three different types of positions wherein magnetic tape cartridges 351-351 may be placed by robotic arm 302. Those types are data transfer type positions comprising magnetic tape drives 321-323, import/export type positions 331-333 where magnetic tape cartridges can be put into or removed from automated removable media system 300, and media storage type positions 341-348 where magnetic tape cartridges are stored until needed in other positions. While elements 301-304 and magnetic tape drives 321-323 are shown connected by direct links, elements 301-user system 304 may communicate through intermediate networks, systems, or devices.

It should be understood that elements in automated removable media system 300 are not shown to scale or to represent the actual look of a magnetic tape library but, rather, are meant only to provide a clear basis for explaining the concepts provided herein. As such, automated removable media system 300 may include any number of positions for which magnetic tape cartridges may be placed, may include any number of magnetic tape cartridges up to the number of available positions, and may be physically arranged in any manner suitable for movement by robotic arm 302. In other examples, additional robotic arms and possibly additional robotic arm control systems may be used to create even larger robotic tape libraries that can benefit from the handling of unsuccessful move operations in the manner described herein.

Figure 4:
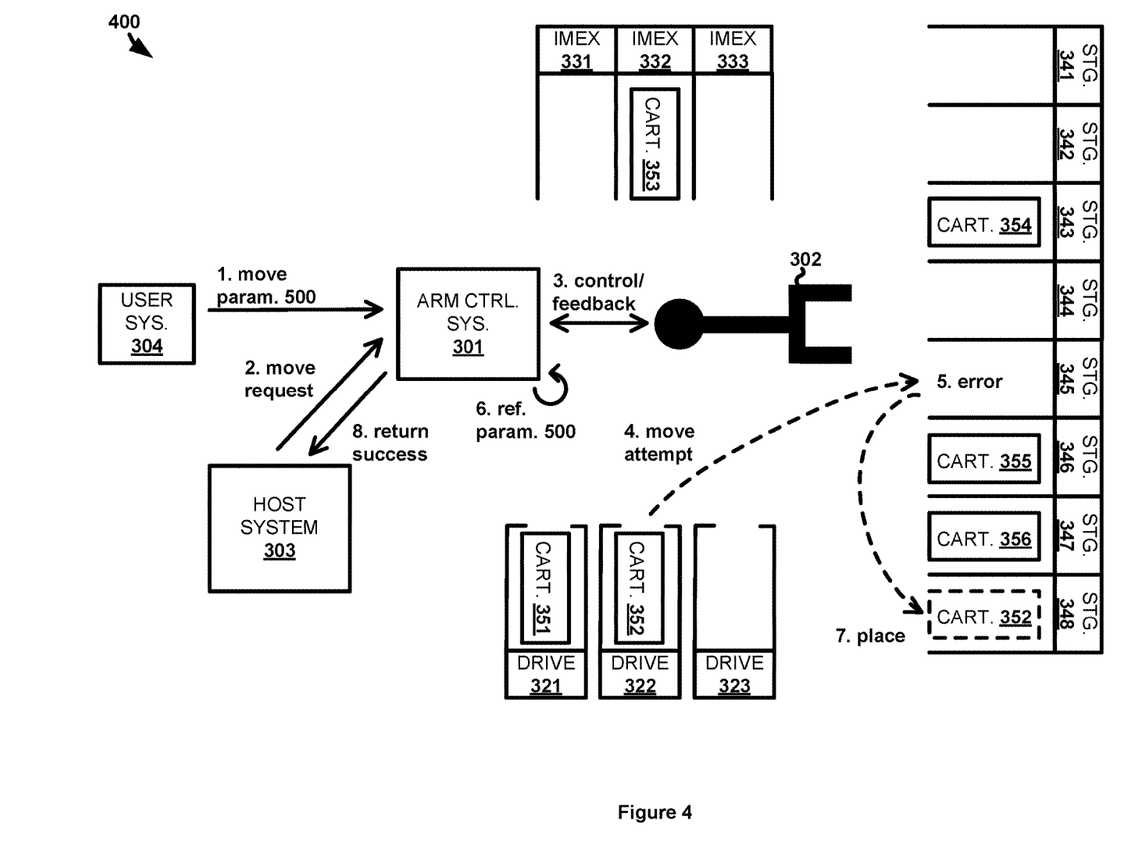
FIG. 4 illustrates an example scenario for operating the other automated removable media system to handle unsuccessful movements of removable storage media items.
Figure 5:
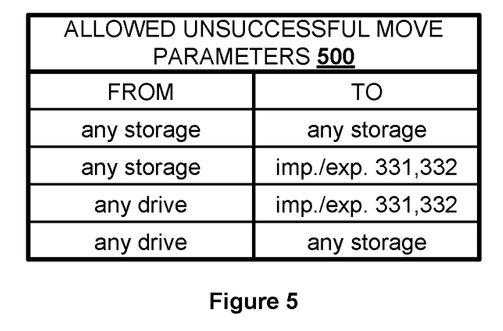
FIG. 5 illustrates move parameters used during the example scenario to handle unsuccessful movements of removable storage media items.

FIG. 4 illustrates an example scenario 400 for operating automated removable media system 300 to handle unsuccessful movements of removable storage media items. In scenario 400, user system 304 provides robotic arm control system 301 with allowed unsuccessful move parameters 500 at step 1. Allowed unsuccessful move parameters 500 are illustrated in FIG. 5. Specifically, allowed unsuccessful move parameters 500 indicate unsuccessful move operations that should be indicated as being successful move operations based on the position a magnetic tape cartridge is being moved from and a position the magnetic tape cartridge is being moved to. However, as noted above, other characteristics of a move, such as time of the move, could also be used for defining allowed unsuccessful move parameters. Allowed unsuccessful move parameters 500 may be amended over time, or removed completely, but do not need to be received prior to or along with each move request. Rather, unsuccessful move parameters may apply to any number of move requests received subsequent to receipt of unsuccessful move parameters 500.

Referring back to FIG. 4, allowed unsuccessful move parameters 500 may be provided to robotic arm control system 301 through host computing system 303 or user system 304 may be in more direct communication with robotic arm control system 301. Allowed unsuccessful move parameters 500 may be input by a user of user system 304 into user system 304 based on what types of unsuccessful move operations the user feels can be indicated as successful without adversely affecting the operation of automated removable media system 300.

At step 2, a move request that will be subject to allowed unsuccessful move parameters 500 is received by robotic arm control system 301 from host computing system 303. Host computing system 303 coordinates the writing of data to and reading of data from magnetic tape cartridges 351-356. For instance, automated removable media system 300 may be used as a data backup archive and host computing system 303 may manage data storage for the data backup archive. In this example, the move request from host computing system 303 requests that magnetic tape cartridge 352 in magnetic tape drive 322 be moved to media storage position 345. The requested movement of magnetic tape cartridge 352 may be in response to host computing system 303 being finished with writing to or reading from magnetic tape cartridge 352 for the time being, which means magnetic tape cartridge 352 is no longer needed in magnetic tape drive 322. Moving magnetic tape cartridge 352 to a media storage position frees up magnetic tape drive 322 for accessing other magnetic tape cartridges.

In response to receiving the request, robotic arm control system 301 directs robotic arm 302 to perform the requested move and receives feedback from robotic arm 302 about the move operation at step 3. Specifically, robotic arm control system 301 directs first moving to retrieve magnetic tape cartridge 352 from magnetic tape drive 322 and then to place magnetic tape cartridge 352 into media storage position 345 at step 4. However, in this example, robotic arm 302 is prevented from placing magnetic tape cartridge 352 into media storage position 345, which results in an error at step 5. As previously noted, the cause of robotic arm 302's inability to place magnetic tape cartridge 352 in media storage position 345 may be caused by a physical defect with media storage position 345, by robotic arm 302 having a grip on magnetic tape cartridge 352 that is beyond positioning tolerances, by some logical issue, such as a user having removed the magazine of media storage position 345 to unload or reload the magazine with media before reinserting it, which may be a non-permanent problem for media storage position 345, or by some other factor(s).

Feedback of the error is received by robotic arm control system 301 and robotic arm control system 301 responsively, at step 6, references allowed unsuccessful move parameters 500 to determine whether the error causes a type of unsuccessful move operation that should be reported as successful. Since magnetic tape drive 322 qualifies as being "any drive" and media storage position 345 qualifies as being "any storage" within the parameters of allowed unsuccessful move parameters 500, robotic arm control system 301 determines that the error does not prevent robotic arm control system 301 from reporting a successful move operation. Upon determining that the unsuccessful move operation can be reported as successful, robotic arm control system 301 directs robotic arm 302 to instead place magnetic tape cartridge 352 into an alternate media storage position at step 7, which is media storage position 348 in this case. Furthermore, robotic arm control system 301 reports that the requested move operation was successful by returning a success notification to host computing system 303 in response to the move request.

Since the requested move operation was not reported as unsuccessful even though it was an unsuccessful move operation, host computing system 303 does not perform anything that host computing system 303 would have performed in response to receiving notice that the move operation was unsuccessful. For example, host computing system 303 may be configured to pause all activity in automated removable media system 300 until the unsuccessful move operation can be remedied by a user while scenario 400 allows host computing system 303 to continue operating without such an interruption.

As described above, the error of step 5 occurs when attempting to place magnetic tape cartridge 352 into media storage position 345. In contrast, it is possible that the error could have occurred when robotic arm 302 attempted to remove magnetic tape cartridge 352 from magnetic tape drive 322 (e.g., magnetic tape cartridge 352 may be jammed in magnetic tape drive 322). In that case, allowed unsuccessful move parameters 500 would still indicate that the unsuccessful move operation should be reported as being successful. However, in some examples, allowed unsuccessful move parameters 500 may define that such a move operation should only be reported as successful if magnetic tape cartridge 352 was removed from magnetic tape drive 322 and/or is able to be placed in an alternative media storage position (the latter criterion may require step 7 to occur before step 6 in scenario 400). Thus, robotic arm control system 301 would report the move operation as being unsuccessful when robotic arm 302 is unable to remove magnetic tape cartridge 352 from magnetic tape drive 322.

Figure 6:
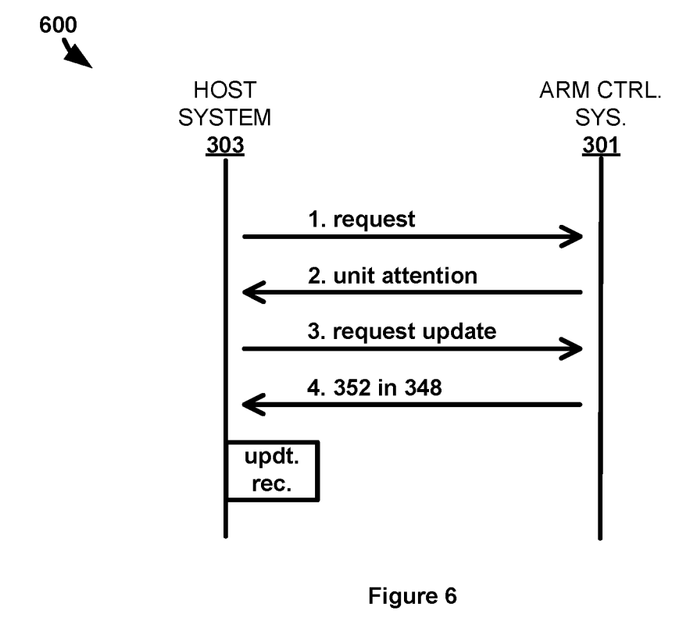
FIG. 6 illustrates another example scenario for operating the other automated removable media system to handle unsuccessful movements of removable storage media items.

FIG. 6 illustrates example scenario 600 for operating automated removable media system 300 to handle unsuccessful movements of removable storage media items. In particular, scenario 600 is an example of what may occur after the completion of scenario 400. At the conclusion of scenario 400, host computing system 303 has been informed that the move request was completed successfully. As such, host computing system 303 registers magnetic tape cartridge 352 as now being located in media storage position 345. Should host computing system 303 request to move magnetic tape cartridge 352 again at some future time, host computing system 303 would direct robotic arm control system 301 to move the magnetic tape cartridge in media storage position 345 since that position is where host computing system 303 thinks magnetic tape cartridge 352 is located. Scenario 600 is therefore performed to inform host computing system 303 about the actual position of magnetic tape cartridge 352 after scenario 400.

In this example, as also may have been the case in scenario 400, the interface between host computing system 303 and robotic arm control system 301 is a Small Computer System Interface (SCSI). At step 1, host computing system 303 transfers another request to robotic arm control system 301. This subsequent request may be any type of request, including a move request similar to the one transferred in step 2 in scenario 400. Preferably, the request that begins scenario 600 is a first request after conclusion of scenario 400 because as host computing system 303 remains uninformed about the true location of magnetic tape cartridge 352 the possibility that host computing system 303 will attempt to perform an incorrect action because of it remains.

Upon receiving the request, at step 2, robotic arm control system 301 reports a SCSI Unite Attention (UA) to host computing system 303, which indicates that a status of one or more elements in automated removable media system 300 have changed. The UA is reported instead of robotic arm control system 301 acting upon the request. Accordingly, in response to the UA, host computing system 303 requests a status update at step 3 from robotic arm control system 301 so that robotic arm control system 301 can inform host computing system 303 about what caused the unit attention. In this example, magnetic tape cartridge 352 being placed in media storage position 348 instead of media storage position 345 caused the UA. Thus, robotic arm control system 301 indicates to host computing system 303 that magnetic tape cartridge 352 is in media storage position 348 at step 4 and host computing system 303 updates its magnetic tape cartridge positioning information to indicate that magnetic tape cartridge 352 is located in media storage position 348. Once host computing system 303 has been updated, robotic arm control system 301 may act on the request received at step 1 or may be configured to wait until host computing system 303 resends the request or sends another request.

While scenario 600 above was described with respect to a SCSI interface, it should be understood that other types of interfaces may be used and other message sequences may be used to notify host computing system 303 of magnetic tape cartridge 352's actual position. For example, rather than sending a UA that host computing system 303 responds to with a status update request, robotic arm control system 301 may simply inform host computing system 303 of the status update.

Figure 7:
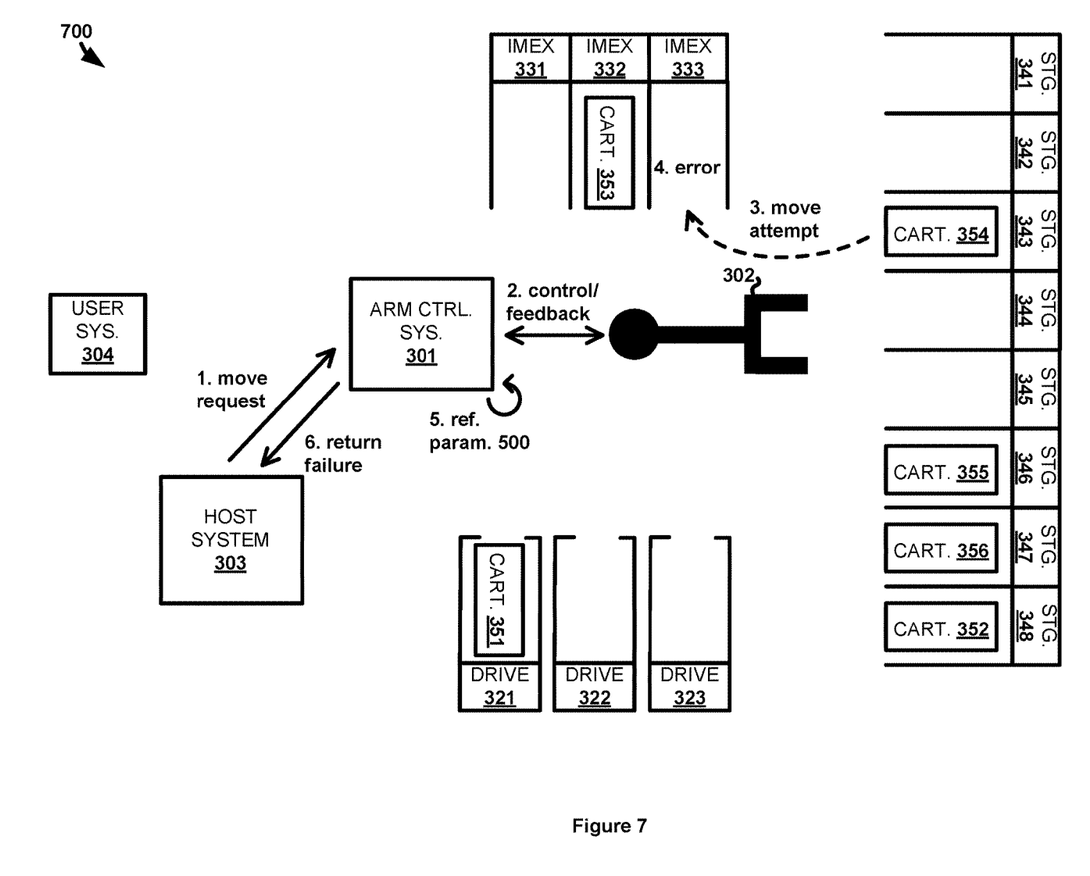
FIG. 7 illustrates yet another example scenario for operating the other automated removable media system to handle unsuccessful movements of removable storage media items.

FIG. 7 illustrates another example scenario 700 for operating automated removable media system 300 to handle unsuccessful movements of removable storage media items. Scenario 700 also occurs at some time after scenario 400 since magnetic tape cartridge 352 is located in media storage position 348, although, scenario 700 could just as easily have been performed before magnetic tape cartridge 352 was moved but after allowed unsuccessful move parameters 500 were received by robotic arm control system 301.

At step 1, receives a move request from host computing system 303 that requests magnetic tape cartridge 354 be moved from media storage position 343 to media import/export position 333. In response to receiving the request, robotic arm control system 301 directs robotic arm 302 to perform the requested move and receives feedback from robotic arm 302 about the move operation at step 2. Specifically, robotic arm control system 301 directs first moving to retrieve magnetic tape cartridge 354 from media storage position 343 and then to place magnetic tape cartridge 352 into media import/export position 333 at step 3.

In this example, robotic arm 302 is unable to place magnetic tape cartridge 354 into media import/export position 333, as indicated by the error at step 4. Robotic arm 302's inability to place magnetic tape cartridge 354 may occur due to a reason similar to the inability to place magnetic tape cartridge 352 in media storage position 345 or may occur due to some other reason. Regardless of the reason, the feedback from robotic arm 302 indicates the error to robotic arm control system 301. In response to the error indicating to robotic arm control system 301 that the move operation was unsuccessful, robotic arm control system 301 references allowed unsuccessful move parameters 500 to determine whether the move operation should still be indicated as successful to host computing system 303.

Media storage position 343 qualifies as "any storage" within the parameters of allowed unsuccessful move parameters 500 but media import/export position 333 is not one of "import/export 331, 332." Media import/export position 333 may not be included in allowed unsuccessful move parameters 500 because a user determined, for whatever reason, that a move operation directed to media import/export position 333 to end up in that position. Therefore, the move operation requested by host computing system 303 in scenario 700, if unsuccessful, is not an unsuccessful move operation that should still be reported as being successful. Accordingly, at step 6, robotic arm control system 301 reports the unsuccessful move operation by retuning a move failure notification to host computing system 303. Host computing system 303 may then pause operations until the move operation failure can be addressed by a user or handle the failure in some other manner. In the meantime, robotic arm 302 may also pause where it encountered the error, may place magnetic tape cartridge 354 back into media storage position 343, or may perform some other action.

Advantageously, the provision of allowed unsuccessful move parameters 500 to robotic arm control system 301 allows for a user to define certain unsuccessful move operations that should be reported as being successful while still allowing other unsuccessful move operations to be reported as such.

Figure 8:
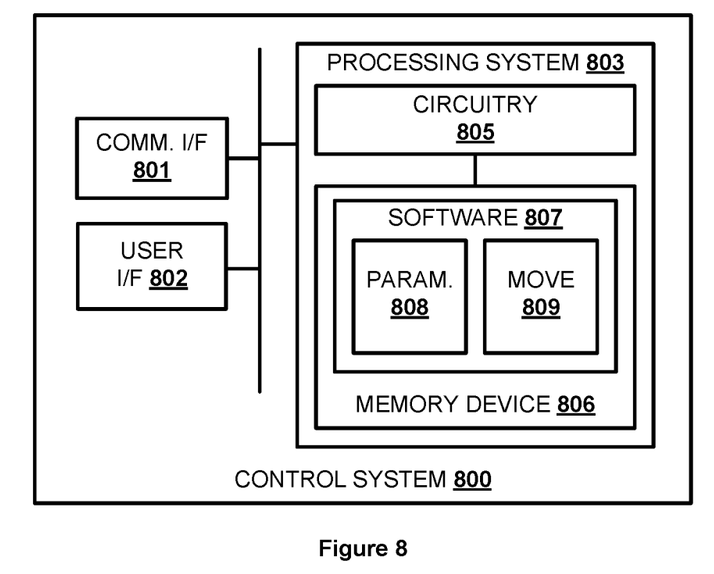
FIG. 8 illustrates a computing architecture for handling unsuccessful movements of removable storage media items.

FIG. 8 illustrates control system 800. Control system 800 is an example of media movement control system 101, although system 101 may use alternative configurations. Control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, SCSI, RS-232, CAN, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes parameters module 808 and media movement module 809. Operating software 807 may further include an operating system, utilities, drivers, network interfaces, applications, or some other type of software. When executed by circuitry 805, operating software 807 directs processing system 803 to operate control system 800 as described herein.

In particular, parameters module 808 directs processing system 803 to receive one or more user provided parameters that indicate one or more types of unsuccessful media move operations that should be reported as successful. Media movement module 809 directs processing system 803 to receive a first request to move a first item of removable storage media from a first position in an automated removable media system to a second position in the automated removable media system and initiate a first move operation of the first item from the first position to the second position by at least one changer device. Parameters module 808 directs processing system 803 to determine that the first move operation resulted in one of the one or more types of unsuccessful media move operations and indicate that the first move operation was successful in response to the first request.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a system for moving items of removable storage media in an automated removable media system, the method comprising:
    in a processing system:
        receiving one or more user provided parameters that indicate one or more types of unsuccessful media move operations that should be reported as successful;
        receiving a first request to move a first item of removable storage media from a first position in the automated removable media system to a second position in the automated removable media system;
        initiating a first move operation of the first item from the first position to the second position by at least one changer device;
        determining that the first move operation resulted in one of the one or more types of unsuccessful media move operations; and
        indicating that the first move operation was successful in response to the first request.

2. The method of claim 1, further comprising:
    determining an alternative position in the automated removable media system to which the first item was moved.

3. The method of claim 2, further comprising:
    receiving a second request; and
    before handling the second request, indicating that the first item is located in the alternative position.

4. The method of claim 3, wherein indicating that the first item is located in the alternative position comprises:
    reporting a Small Computer System Interface (SCSI) Unit Attention (UA) code indicating that a status of at least one item of removable storage media has changed; and
    providing the alternative position as a status of the first item.

5. The method of claim 1, wherein the first position and the second position each comprise one of a media storage position type, a media import/export position type, and a data transfer position type.

6. The method of claim 1, wherein at least one of the one or more types of unsuccessful media move operations that should be reported as successful comprises an unsuccessful media move operation wherein the second position comprises the media storage position type or the import/export position type but not the data transfer position type.

7. The method of claim 1, wherein the one or more user provided parameters indicate that unsuccessful media move operations that require a specific position for the second position should be reported as unsuccessful.

8. The method of claim 1, wherein the one or more user provided parameters indicate that unsuccessful media move operations associated with a certain application should be reported as unsuccessful.

9. The method of claim 1, wherein the first request comprises a Small Computer System Interface (SCSI) move command.

10. The method of claim 1, wherein the first item comprises a magnetic tape cartridge, the automated removable media system comprises a robotic tape library, and the at least one changer device comprises a robotic arm.

11. A system for moving items of removable storage media in an automated removable media system, the system comprising:
    one or more computer readable storage media;
    a processing system operatively coupled with the one or more computer readable storage media; and
    program instructions stored on the one or more computer readable storage media that, when read and executed by the processing system, direct the processing system to:
        receive one or more user provided parameters that indicate one or more types unsuccessful media move operations that should be reported as successful;
        receive a first request to move a first item of removable storage media from a first position in the automated removable media system to a second position in the automated removable media system;

initiate a first move operation of the first item from the first position to the second position by at least one changer device;

determine that the first move operation resulted in one of the one or more types of unsuccessful media move operations; and indicate that the first move operation was successful in response to the first request.

12. The system of claim 11, further comprising:
determining an alternative position in the automated removable media system to which the first item was moved.

13. The system of claim 12, further comprising:
receiving a second request;
before handling the second request, indicating that the first item is located in the alternative position.

14. The system of claim 13, wherein indicating that the first item is located in the alternative position comprises:
reporting a Small Computer System Interface (SCSI) Unit Attention (UA) code indicating that a status of at least one item of removable storage media has changed; and
providing the alternative position as a status of the first item.

15. The system of claim 11, wherein the first position and the second position each comprise one of a media storage position type, a media import/export position type, and a data transfer position type.

16. The system of claim 11, wherein at least one of the one or more types of unsuccessful media move operations that should be reported as successful comprises an unsuccessful media move operation wherein the second position comprises the media storage position type or the import/export position type but not the data transfer position type.

17. The system of claim 11, wherein the one or more user provided parameters indicate that unsuccessful media move operations that require a specific position for the second position should be reported as unsuccessful.

18. The system of claim 11, wherein the one or more user provided parameters indicate that unsuccessful media move operations associated with a certain application should be reported as unsuccessful.

19. The system of claim 11, wherein the first request comprises a Small Computer System Interface (SCSI) move command.

20. The system of claim 11, wherein the first item comprises a magnetic tape cartridge, the automated removable media system comprises a robotic tape library, and the at least one changer device comprises a robotic arm.

* * * * *